July 19, 1966 F. J. HENKEL 3,261,235
PORTABLE ROTARY MACHINING APPLIANCE AND APPARATUS
Filed Dec. 3, 1963 5 Sheets-Sheet 1

INVENTOR.
FERDINAND J. HENKEL
BY
Barthel & Bugbee
ATTORNEYS

July 19, 1966 F. J. HENKEL 3,261,235
PORTABLE ROTARY MACHINING APPLIANCE AND APPARATUS
Filed Dec. 3, 1963 5 Sheets-Sheet 2
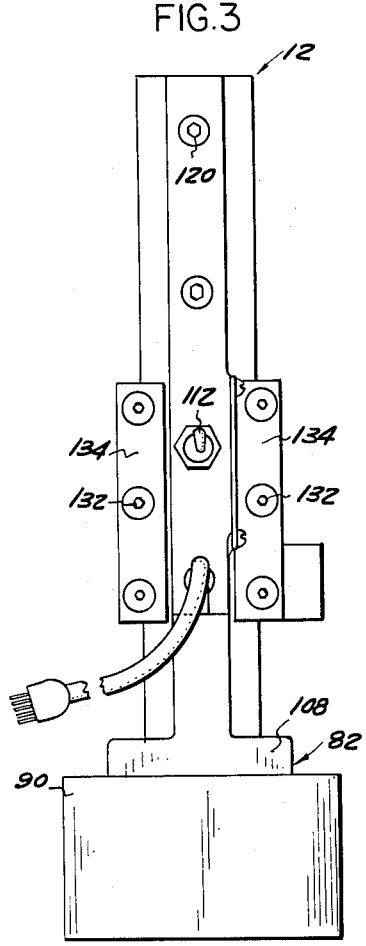
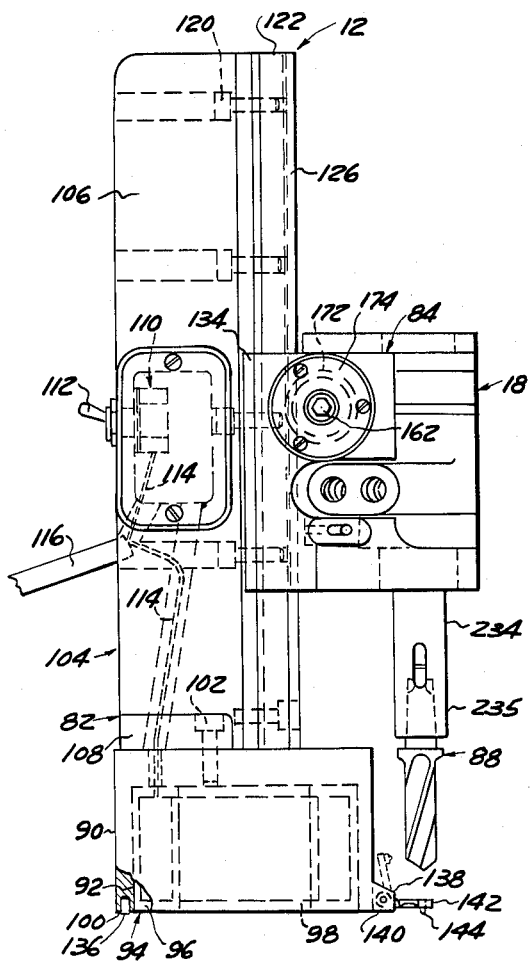
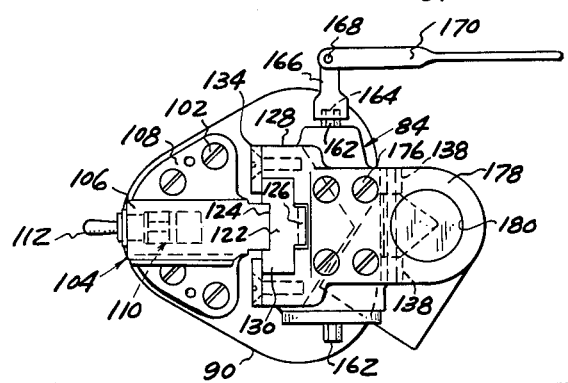
INVENTOR.
FERDINAND J. HENKEL
BY Barthel & Bugbee
ATTORNEYS

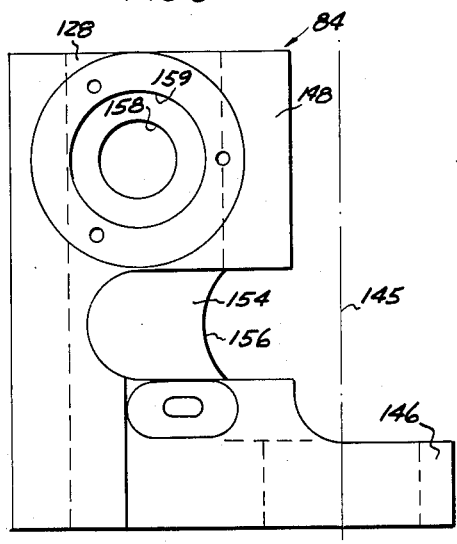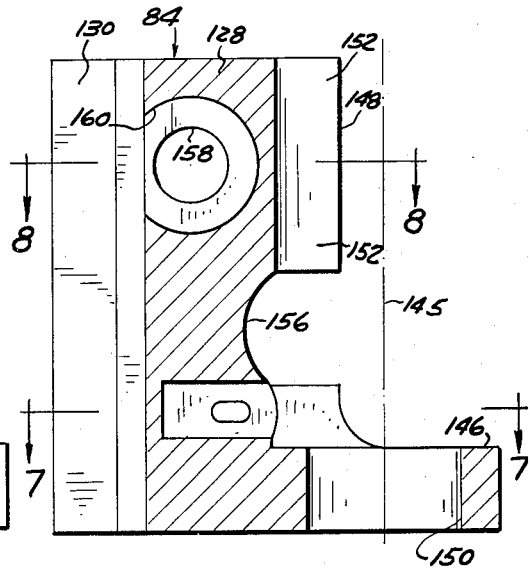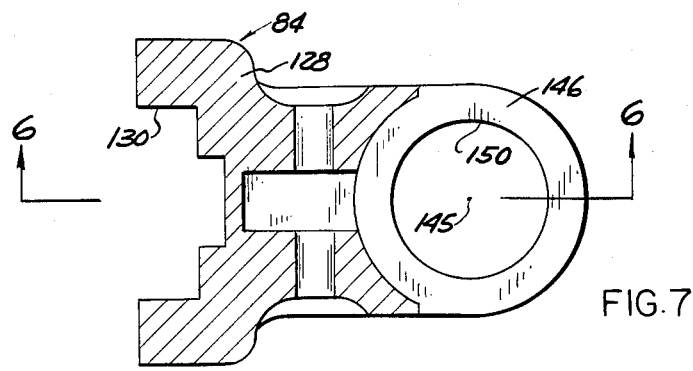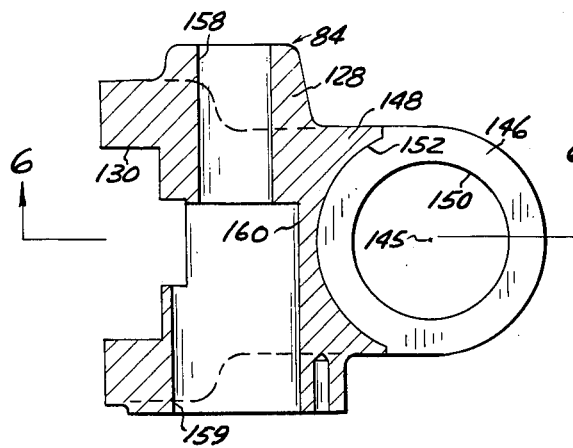

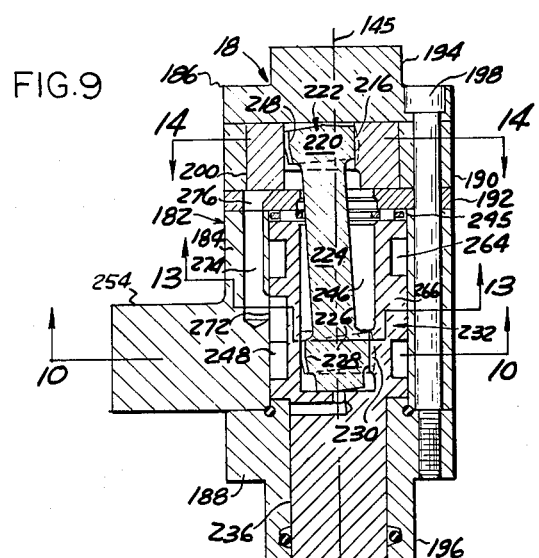
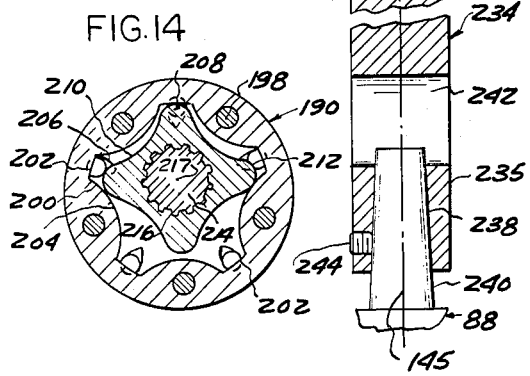
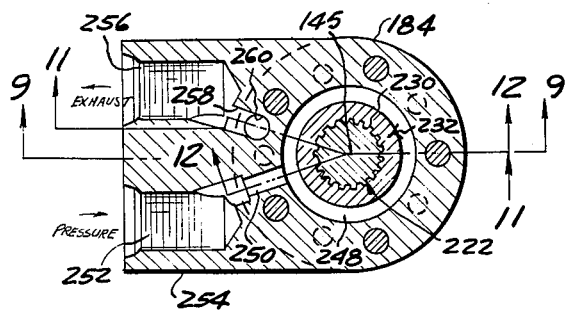
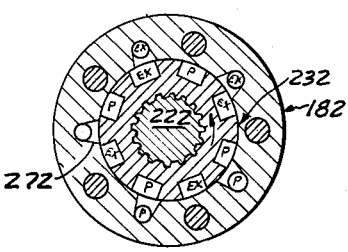

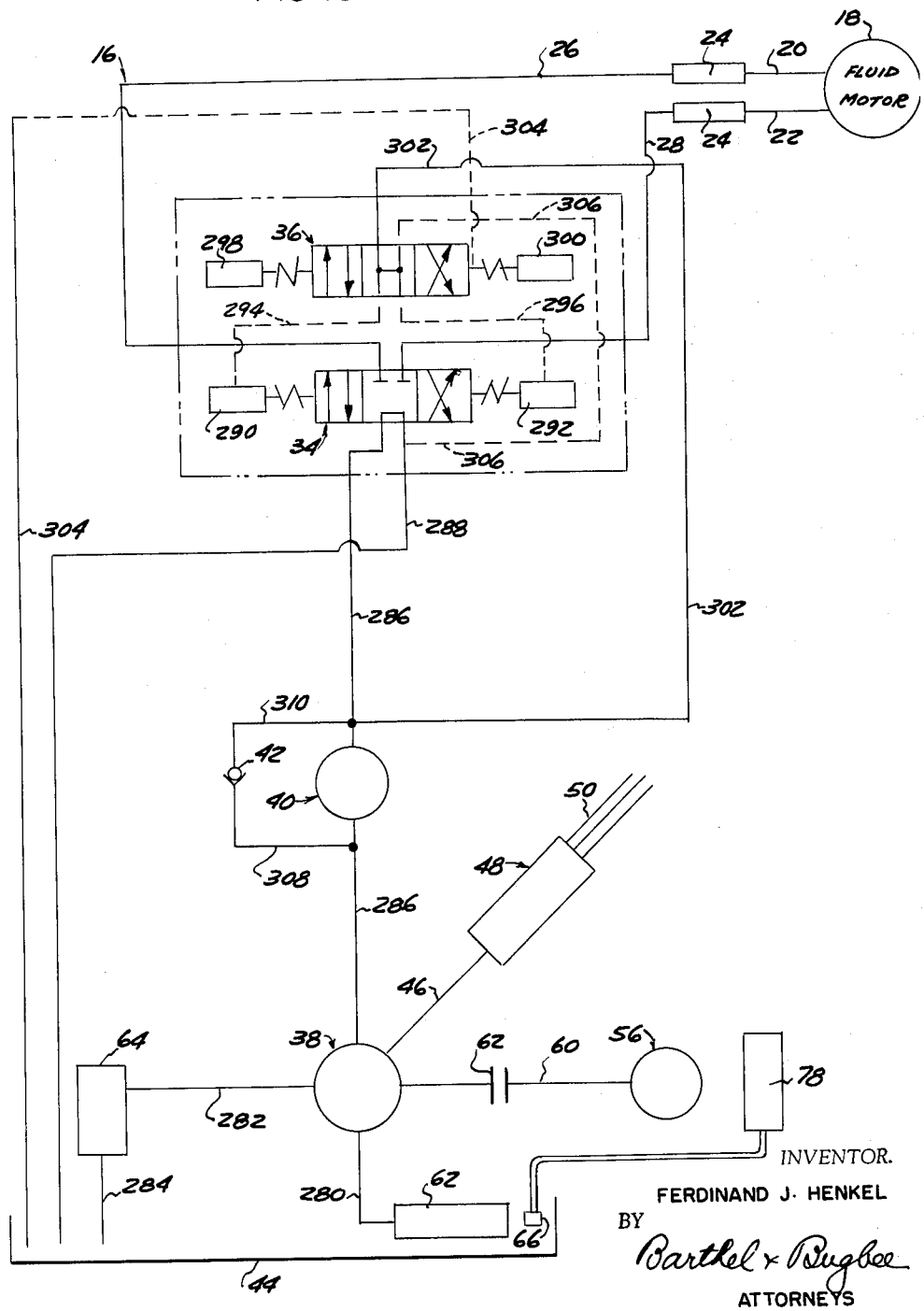

United States Patent Office 3,261,235
Patented July 19, 1966

3,261,235
PORTABLE ROTARY MACHINING APPLIANCE
AND APPARATUS
Ferdinand J. Henkel, Birmingham, Mich., assignor to
Lamina, Inc., Berkley, Mich., a corporation of Michigan
Filed Dec. 3, 1963, Ser. No. 327,656
10 Claims. (Cl. 77—7)

This invention relates to machine tools and, in particular, to rotary machining appliances including a rotary tool for drilling, reaming, tapping, spot-facing, chamfering, milling or the like.

Hitherto, there has existed a serious problem in machining heavy workpieces or those attached to structures which are not easily movable because of their bulk, weight or fixed location. Even where heavy workpieces could be moved to drilling, reaming and tapping machines, the time consumed in so doing added enormously to the cost of the operation, together with the necessity of employing cumbersome and expensive work handling equipment, such as portable or overhead traveling cranes. The present invention has solved this problem by providing a compact portable rotary machining device which does not require the work to be moved.

Accordingly, one object of this invention is to provide a compact portable rotary machining appliance which can be taken to the work to be machined, installed in a very small available space, and there operated to perform the rotary machining operations such as drilling, reaming, tapping or the like.

Another object is to provide a compact portable rotary machining appliance of the foregoing character which is equipped with a magnetically-actuated work-gripping device which, when energized, securely holds the appliance against the work in an immovable position while the machining operation or operations are carried out.

Another object is to provide a compact portable rotary machining appliance of the foregoing character which includes its own guiding arrangement for guiding the machining tool before and during its entry into the work in performing the machining operation.

Another object is to provide a compact portable rotary machining appliance of the foregoing character which includes a retractible pointer for lining up the rotary tool of the appliance with the center of the hole to be machined, the pointer being movable out of the way of the rotary tool, such as a drill, when drilling commences.

Another object is to provide a compact portable rotary machining appliance of the foregoing character, wherein the tool is rotated by a hydraulic motor which is supplied with hydraulic pressure fluid through a flexible hose connected to a remotely-located electrically-actuated hydraulic power unit, thereby further enhancing the compactness of the appliance and its capability of drilling or performing other rotary machining operations in a very confined space.

Another object is to provide a compact portable rotary machining appliance as set forth in the object immediately preceding, wherein means is provided at the location of the appliance for controlling the operation of the remotely-located hydraulic power unit, so that the operator can observe and precisely control the action of the appliance from a position adjacent the appliance while regulating the operation and speed of the hydraulic motor through the regulation of the hydraulic power unit by such remote control.

Other objects and advantages of the invention will become apparent during the course of the following description of the accompanying drawings, wherein:

FIGURE 2 is a side elevation upon an enlarged scale of the rotary machining appliance shown at the left-hand side of FIGURE 1;

FIGURE 3 is a rear elevation of the rotary machining appliance shown in FIGURE 2;

FIGURE 4 is a top plan view of the appliance shown in FIGURES 2 and 3;

FIGURE 5 is a left-hand side elevation upon a further enlarged scale, of the rotary machining appliance slide, removed from the appliance;

FIGURE 6 is a central vertical section taken along the line 6—6 in FIGURES 7 and 8;

FIGURE 7 is a lower horizontal section taken along the line 7—7 in FIGURE 6;

FIGURE 8 is an upper horizontal section taken along the line 8—8 in FIGURE 6;

FIGURE 9 is a central vertical section upon the same scale as FIGURES 5 to 8 inclusive, through the rotary hydraulic motor drive unit, removed from the slide of the rotary machining appliance of FIGURES 2 to 4 inclusive, taken along the line 9—9 in FIGURE 10;

FIGURE 10 is a horizontal section taken along the line 10—10 in FIGURE 9;

FIGURE 11 is a vertical section taken along the broken line 11—11 in FIGURE 10;

FIGURE 12 is a vertical section taken along the line 12—12 in FIGURE 10;

FIGURE 13 is a lower horizontal section taken along the line 13—13 in FIGURE 9;

FIGURE 14 is an upper horizontal section taken along the line 14—14 in FIGURE 9;

FIGURE 15 is a view similar to FIGURE 11 but with the fluid timing and distributing head shown in side elevation; and FIGURE 16 is a diagram of the electro-hydraulic operating circuit for the appliance and power unit of FIGURE 1.

General arrangement

Figure 1:
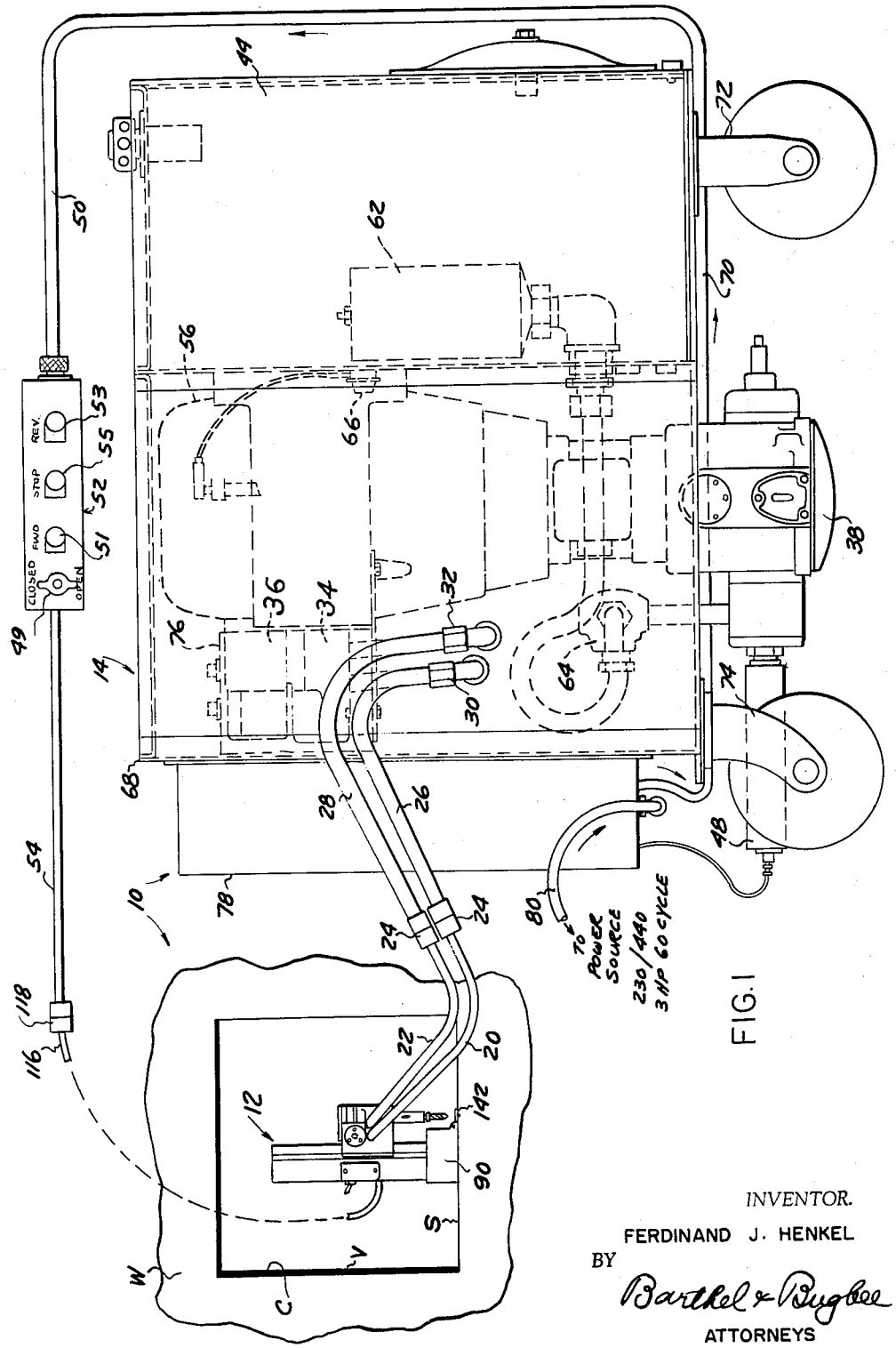
FIGURE 1 is a side elevation of a compact portable rotary machining appliance, according to one form of the invention, in position for drilling a workpiece in a confined space, showing the remotely-located electrically-actuated hydraulic power unit and remote control arrangement therefor.

Referring to the drawings in general, FIGURE 1 shows in side elevation the general arrangement of a compact portable rotary machining apparatus, generally designated 10, including a compact rotary machining appliance 12 operated by an electro-hydraulic power supply unit 14, the electro-hydraulic circuit 16 of which is shown diagrammatically in FIGURE 16. The appliance 12 includes a rotary hydraulic motor 18 connected by high pressure hydraulic hoses 20 and 22 through couplings 24 to similar hoses 26 and 28 (FIGURE 1) which in turn are connected to pressure and exhaust connections 30 and 32 respectively of a main hydraulic control valve 34 (FIGURE 16). The control valve 34 is a conventional four-way valve and its connections to the remainder of the electro-hydraulic circuit 16 will be discussed in detail more fully below.

The main control valve 34 is operated hydraulically by a conventional solenoidally-operated pilot valve 36 and delivers hydraulic pressure fluid from a hydraulic pump 38 through a filter 40 equipped with a bypass check valve 42 through the pressure fluid supply lines or hoses 26, 20 to the hydraulic motor 18, which discharges through the exhaust lines or hoses 22 and 28 to a hydraulic fluid tank 44. The hydraulic pump 38 is of conventional variable delivery type, the control rod 46 of which is shifted by an electrical actuator 48 which in turn is connected by a multi-conductor cable 50 (FIGURE 1) controlled by a toggle switch 49 at a remote control station 52 located near the appliance 12 and provided with forward, reverse and stop pushbutton switches 51, 53 and 55. The remote control station 52 is also connected by a magnetic control conductor cable 54 to the appliance 12 which controls the energization of the magnetic holding means for the appliance 12, as described more fully below.

The electro-hydraulic circuit 16 (FIGURES 1 and 16) also contains an electric motor 56 drivingly connected through a shaft 60 and coupling 62 to the hydraulic pump 38, whch draws oil or other hydraulic fluid from the tank 44 through a magnetic 100-mesh strainer 62 which collects foreign matter both magnetic and non-magnetic and prevents it from reaching the pump. Also connected to the pump 38 is a hydraulic pressure relief valve 64 which discharges into the tank 44 when the pressure delivery of the pump 38 exceeds a predetermined maximum. Also connected to the energization circuit of the motor 56 is a thermal switch 66 which deenergizes the electric motor 56 in the event of the attainment of a dangerously high temperature in the oil.

The electro-hydraulic supply unit 14 is disposed in a housing 68 mounted on a hand truck 70 (FIGURE 1) equipped with fixed wheels 72 and caster wheels 74 respectively. Mounted in the housing 14 is a storage battery 76 which is connected to the magnetic control conductor cable 54 to energize the magnetic holding means within the appliance 12, as described below. An electrical control boss 78 is secured to the forward end of the housing 68 and in turn receives power current from an electric power supply conductor cable 80. The electrical control box 78 controls the energization of the electric pump-driving motor 56 and contains other electrical components of the circuit 16.

*Rotary machining appliance construction*

The rotary machining appliance 12 (FIGURES 2 to 8 inclusive) consists generally of a supporting structure or frame 82 upon which is vertically slidably mounted a slide or carriage 84 which in turn carries the rotary hydraulic motor 18 drivingly connected to the rotary machining tool 88 which in this instance is shown as a drill. The frame or supporting structure 82 includes a hollow base 90 containing a recess 92 in which is mounted an electro-magnet 94 (FIGURE 2). The electro-magnet 94 is of the type employed in a magnetic chuck and is contained within a casing 96. The electro-magnet 94 has a face 98 flush with the bottom edge 100 of the base 90 and is adapted, when energized, to hold the base 90 firmly and immovably against a surface S of a ferrous metal workpiece W which is to be machined by the appliance 12. When de-energized, the electro-magnet 94 releases its grip upon the workpiece surface S so that the appliance 12 may be removed from the cavity or restricted space C in which the machining is to be performed.

Bolted or otherwise secured as at 102 (FIGURE 4) to the hollow base 90 is an upright 104 including a vertical support portion 106 having at its lower end mounting flanges 108 secured by the bolts 102 to the base 90. Mounted on the upright 104, which is hollow, is a magnet energization control switch 110 having an operating lever 112 (FIGURE 2). The magnet 94 is connected by wiring 114 to a three-conductor cable 116 by way of the switch 110 which in turn is coupled at 118 to the multi-conductor cable 54 to the remote control station 52.

Bolted or otherwise secured as at 120 to the vertical support portion 106 is a rack-toothed guide bar 122 (FIGURES 2 and 4) constituting a guideway of approximately rectangular cross-section grooved at 124 to receive the vertical support portion 106 and in turn having a toothed rack portion 126 projecting forwardly therefrom. Vertically slidably mounted on the guide bar 122 is the correspondingly-grooved vertical rearward portion 128 of the slide 84 (FIGURE 4), the T-groove 130 of which slidably engages the guide bar 122 and receives the rack portion 126. Bolted at 132 to the rearward faces of the rearward portion 128 of the slide 84 are elongated laterally-spaced parallel retaining plates or gibs 134 (FIGURE 3.)

Mounted in and projecting slightly downward from the lower face or edge 100 of the base 90 are wear pins or spacing elements 136 of tungsten carbide or other similar non-magnetic wear-resisting material. The pins 136 engage the work surface S and also break the residual magnetism. Projecting forwardly from the base 90 are spaced parallel bosses 138 (FIGURES 2 and 4) carrying a horizontal pivot rod 140. Pivotally supported upon the pivot rod 140 for tilting motion between horizontal and approximately vertical positions is an approximately triangular machining center locating plate 142 having at its apex a downwardly-projecting sharp pointed locating pin or alignment indicator 144 which is precisely located in coincidence with the axis of rotation 145 of the rotary machining tool 88. FIGURE 2 shows the locating plate 142 in its horizontal advanced or locating position in solid lines and in its approximately vertical retracted position in dotted lines, when not in use.

The slide 84 (FIGURES 5 to 8 inclusive) which receives and holds the rotary hydraulic motor drive unit 86 is of irregular shape. Projecting forwardly from the lower and upper ends of the vertical rearward portion 128 of the slide 84 are lower and upper arms 146 and 148 respectively. The lower arm 146 contains a vertical cylindrical bore 150, whereas the upper arm 148 contains a vertical cylindrical bore 150, whereas the upper arm 148 contains a vertical partially cylindrical abutment surface or casing seat 152 coaxial with the bore 150 which in turn is coaxial with the axis of rotation 145 of the rotary machining tool 88. Located between the lower and upper arms 146 and 148 is an approximately V-shaped cutaway portion 154 extending rearwardly in oblique directions from its apex 156 (FIGURE 5). Formed in the rearward portion 128 of the slide 84 immediately behind the upper arm 148 are aligned horizontal bearing bores 158 and 159 which at their inner ends open into an enlarged approximately cylindrical cavity 160. Journaled in the bearing bores 158 are the opposite ends of a pinion shaft 162 with hexagonal outer ends adapted to receive a correspondingly hexagonal socket 164 in a head 166 (FIGURE 4) pivoted at 168 to a hand lever 170. Mounted on the pinion shaft 162 within the cavity 160 and keyed or otherwise drivingly secured thereto is a pinion 172 which meshes with the rack portion 126 of the guide bar 122. As a consequence, when the hand lever 170 is swung upward or downward in an arcuate path, the pinion 172 rolls upward or downward along the rack portion 126, carrying with it the slide 84 for the purpose of feeding the rotary machining tool 88 to the work surface S or retracting it therefrom, as the case may be. A retaining disc 174 is bolted or otherwise secured to the left side of the slide 84 and through it the left-hand end of the pinion shaft 162 projects (FIGURE 2). Bolted or otherwise secured at 176 to the top of the slide 84 (FIGURE 4) is a horizontal retaining plate 178 having therein a bore 180 coaxial with the bore 150 in the lower arm 146 and thus concentric with the axis of rotation 145 of the rotary machining tool 88.

*Rotary hydraulic motor construction*

The rotary hydraulic motor 18 which rotates the machining tool 88 includes an approximately cylindrical multi-part casing, generally designated 182 (FIGURES 9 to 14 inclusive) having a main portion 184, top and bottom heads 186 and 188 respectively, a stator disc 190 and a separator disc 192. The top head 186 has an upstanding machined cylindrical boss 194, and the bottom head 188 a reduced diameter downwardly-extending cylindrical portion 196 which snugly fit the bore 180 in the retaining plate 178 and the bore 150 in the lower arm 146 respectively, thereby firmly holding the rotary hydraulic motor 18 solidly in the slide 84. The cylindrical portions 194 and 196 are formed coaxial with the axis of rotation 145 of the rotary machining tool 88, and the casing components 186, 190, 192 and 184 are drilled in alignment at five circumferentially-spaced locations (FIGURE 10) to receive tie bolt 198 threaded into the correspondingly drilled and threaded bottom head 188 (FIGURE 9).

The upper stator disc 190 is open-centered, it being provided with a five-lobed bore 200 (FIGURE 14) including alternate recesses or pockets 202 and inwardly arcuate or convex projections 204. Rollably and slidably engaging the lobed bore 200 in a circularly orbital path is a four-lobed rotor 206 composed of four outwardly-projecting tooth-like lobes 208 separated from one another by concave portions 210. The lobes 208 have rounded ends 212 which roll across the recesses 202 which are of arcuate configuration centered at the point 214 on the axis of rotation 145 of the machining tool 88. The central portion on the rotor 206 is provided with an internally-splined bore 216 centered at 217 eccentrically to the center 214.

Meshing with the internally-splined bore 216 are the oppositely-bevelled arcuate involute splines or teeth 218 of the externally-splined upper head 220 of a power-transmitting member 222 (FIGURES 9 and 14). The latter is roughly in the shape of a dumbbell having an intermediate or shaft portion 224 (FIGURE 9) which on its lower end carries a similar externally-splined lower head 226 also having oppositely-bevelled involute splines or teeth 228 aligned with the upper teeth 218. The teeth or splines 228 mesh with the internally-splined bore 230 (FIGURE 10) in the cup-shaped cylindrical fluid timing and distributing head 232 on the upper end of an output shaft 234 journaled in a bore 236 in the lower head 188 coaxial with the axis of rotation 145 of the rotary machining tool 88. The shaft 234 has a tool holder 235 with a conical or tapered tool holding socket 238 adapted to matingly receive the correspondingly-tapered shank 240 of the tool 88. The upper end of the shank 240 projects into a cross passageway 242 provided for the insertion of a conventional knockout wedge (not shown) for ejecting the tool 88 in order to replace it with another tool 88. The lower end of the shaft 234 is drilled and threaded transversely to receive a set screw 244, such as an Allen screw, which engages the shank 240 and holds it in the socket 238. A radial needle bearing assembly 245 sustains the rotation and thrust of the output shaft 234. The above-described construction is such that the dumbbell-shaped power-transmitting member 222 can rock as well as rotate while its arcuate external splines or teeth 218 maintain driving connections respectively with the internally-splined bores 216 and 230.

The timing and distributing head 232 of the output shaft 234 is provided with a central enlarged bore or passageway 246 to accommodate the oscillating and rotating motion of the shaft portion 224 of the power-transmitting member 222 during operation of the motor 18, as explained below. Surrounding the lower end of the timing and distributing head 232 of the output shaft 234 is an annular pressure channel 248 which constantly receives pressure fluid through a radial passageway 250 (FIGURE 10) which leads inward from a threaded pressure fluid supply port 252 in an arm or lateral extension 254 of the main casing portion 184. The casing extension 254 also contains a threaded exhaust or fluid discharge port 256 from which a radial passageway 258 leads inward to an upwardly-extending longitudinal or axial exhaust passageway 260 (FIGURE 11). The upper end of the longitudinal passageway 260 terminates in an inwardly-extending port 262 which opens into an annular exhaust channel 264 in the timing and distributing head 232 of the output shaft 234 and is spaced axially above the annular pressure channel 248.

The annular fluid pressure and exhaust channels 248 and 264 (FIGURE 15) are separated from one another by a cylindrical portion 266 which is provided with four downwardly-directed fluid pressure ducts 268 of inverted U-shaped outline spaced at equal circumferential intervals therearound, thus opening downwardly into the pressure fluid channel 248. The cylindrical portion 266 also contains four equally circumferentially-spaced upwardly-directed fluid exhaust ducts 270 disposed in equally-spaced circumferential relationship with the downwardly-directed pressure ducts 268 in alternating succession with one another. The exhaust ducts 270 open into the annular exhaust channel 264.

Registering with the pressure and exhaust ducts 268 and 270 in timed succession during rotation thereof are five equally circumferentially-spaced horizontal or radial ports 272 (FIGURE 9) located opposite approximately the midportion of the cylindrical portion 266 of the fluid timing and distributing head 232 and at their outer ends opening into vertical or axial passageways 274 which at their upper ends open into aligned upwardly-flared ports 276 in the separator disc 192. The five flared ports 276 at their upper ends open into the five pockets 202 in the stator disc 190.

Electro-hydraulic operating circuit

The components of the electro-hydraulic operating circuit for the compact portable rotary machining apparatus shown in FIGURE 16 have been described above under the heading "General Arrangement" and only their essential details and connections remain to be described. From the magnetic suction strainer 62 in the oil or other hydraulic fluid tank 44, a pump suction conduit 280 extends to the suction side of the hydraulic pump 38 from the pressure side of which a pressure relief conduit 282 runs to the pressure relief valve 64, whence a fluid discharge conduit 284 extends back into the tank 44. From the hydraulic pump 38 a pressure fluid delivery or supply conduit 286 extends by way of the filter 40 to the main hydraulic control valve 34, whence a fluid exhaust conduit 288 returns to the tank 44. The main hydraulic control valve 34 is shifted by hydraulic servo-cylinders 290 and 292 at opposite ends of its reciprocable piston valve member (not shown). Supply and exhaust of fluid to the servo-cylinders 290 and 292 are controlled by the solenoidally-operated pilot valve 36 by control fluid conduits 294 and 296 extending therebetween.

The shifting of the pilot valve 36 is controlled by electrically-energized solenoids 298 and 300 which, when alternately energized, shift its piston valve member (not shown) to supply pressure fluid to one of the pilot conduits 294 or 296 and exhaust it from the other. Pressure fluid, such as hydraulic oil, is supplied to the pilot valve 36 by an auxiliary or branch pressure fluid supply line 302 extending thereto from the main pressure fluid supply conduit 286 above the filter 40. Fluid is exhausted from the pilot valve 36 through a pilot valve exhaust conduit 304 back to the tank 44, also through an exhaust conduit 306 extending to a junction with the main exhaust conduit 288. As previously stated, the main fluid control valve 34 and pilot valve 36 are conventional, well-known to those skilled in the hydraulic art, and their details are beyond the scope of the present invention. The hydraulic oil filter 40 is provided with bypass conduits 308 and 310 leading to and from the check valve 42, which opens in the event the filter 40 functions inadequately.

Operation of the rotary machining apparatus as a whole

In the operation of the rotary machining apparatus 10, let it be assumed that the electro-hydraulic supply unit 14 and the rotary machining appliance 12 have been transported to the location where the machining, such as drilling, is to be performed by moving on the hand truck 70. Assuming, for example, that the ferrous metal workpiece W contains a restricted cavity C, one surface S of which is to be drilled, the rotary machining appliance 12 is moved into the cavity C as shown in FIGURE 1, with its base 90 resting upon the surface S to be drilled. The appliance 12 is moved relatively to the surface S until the locating pin 144 of the locating plate 142 is brought into alignment with the center of the hole to be drilled, whereupon the operator closes the switch 110 by means of the handle 112, thereby energizing the electromagnet 94 and thus firmly and fixedly securing the appliance 12 to the surface S at the location to be drilled. The locating plate 142 is then swung upward around its pivot 140 to its dotted line position shown in FIGURE 2, out of the way of the rotary machining tool 88, in this case a drill.

The operator then energizes the electric motor 56 (FIGURE 16) which drives the pump 38 to deliver pressure fluid to the pressure fluid supply lines 286 and 302, leading to the pilot valve 36. The operator then depresses the forward push button switch 51 of the remote control station 52 located near the appliance 12, thereby energizing the solenoid 298 to shift the pilot valve 36 to supply hydraulic pressure fluid from the auxiliary supply conduit 302 to the hydraulic servo-cylinder 290, shifting the main control valve 34 so as to supply pressure fluid from the pump 38 through the main pressure fluid supply conduit 286 and supply hoses 26 and 20 to the rotary hydraulic motor 18, the fluid exhausted therefrom being discharged through the hoses 22 and 28 and the main control valve 34 into the exhaust conduit 288 back to the tank 44. Deferring for the moment the description of the operation of the hydraulic motor, the consequent rotation of the hydraulic motor output shaft 234 rotates the drill or other rotary machining tool 88.

The operator, having applied the socket 164 in the head 166 of the hand lever 170 to the pinion shaft 162 at its most convenient end, swings the hand lever 170 downward (FIGURE 4), feeding the rotary tool 88 into the surface S of the workpiece W. When the hole drilled by the tool 88 has been sunk to the required depth, the operator swings upward upon the hand lever 170 to withdraw the tool 88 from the workpiece W. It will be understood that in place of the drill 88, a reamer, tap or other rotary machining tool may be substituted, depending upon the nature of the work to be performed on the workpiece W.

If, during operation, the operator desires to reverse the hydraulic motor 18, he presses the reverse pushbutton switch 53 which as a consequence reverses the pilot valve 36 so as to energize the solenoid 300 and consequently supply hydraulic pressure fluid to the hydraulic servo-cylinder 292 to reversely shift the main control valve 34 and consequently exhaust fluid from the hoses 26 and 20 and supply pressure fluid to the hoses 22 and 28, thereby causing the hydraulic motor 18, output shaft 234 and rotary tool 88 to rotate in a reverse direction. The apparatus is halted at any time by the depressing of the stop push buttom 55 which de-energizes both solenoids 298 and 300. It will be evident that the base 90 of the rotary machining appliance 12 may be placed in any desired position, such as against the side wall V of the cavity C, where it will be held fixedly in position by the electromagnet 94 when energized.

If at any time a dangerous pressure arises in the output of the pump 38, the pressure fluid at such pressure actuates the hydraulic pressure relief valve 64 to dump the excess fluid through the exhaust line 284 and lower the pressure to a safe level. Again, if the filter 40 becomes clogged or otherwise incapable of transmitting the full output of the pump 38, the output is conveyed in whole or in part through the bypass conduits 308 and 310 and the check valve 42 around the filter 40 into the pressure fluid supply lines 286 and 302. Of course, as previously stated, if there is a blockage anywhere in the circuit, other than in the filter 40, the pressure relief valve 64 opens and discharges the fluid directly into the tank 44.

The operator at any time can vary the volume delivery of the variable delivery pump 38 by turning the control knob 49 in one direction or the other to operate and control the pump volume delivery actuator 48 through the multi-conductor cable 50. The magnetic suction strainer 62, at its name indicates, picks up and removes ferrous metal particles from the hydraulic oil and prevents them from reaching the pump or other parts of the hydraulic circuit.

*Operation of rotary hydraulic motor*

In the operation of the rotary hydraulic motor 18, pressure fluid supplied through the ports 252 and 250 (FIGURE 10), enters the lower annular pressure fluid channel 248 in the cup-shaped fluid timing and distributing head 232, whence it passes upward through the downwardly-facing ducts 268 into such of the ports 272 as happen to be momentarily in registry therewith (FIGURE 13). From the ports 272, the pressure fluid passes upward through the longitudinal passageway 274 and flared ports 276 into the pockets 202 in the stator disc 190, acting against the lobes 208 of the rotor 206 and causing rotation thereof. At the same instant, other of the ports 272 are in registry with the upwardly-facing ducts 270 opening into the annular exhaust channel 264 which in turn is in communication with the port 262 (FIGURE 11), axial passageway 260 and exhaust port 258. Thus, fluid discharged from the remaining pockets 202 of the stator disc 190, passes downward through the passageways 276 to the ports 272 momentarily in registry with the exhaust ducts 270 (FIGURE 15), whence the exhaust fluid passes upward into the exhaust channel 264 and thence outward through the port 262, passageway 260 (FIGURE 11) and exhaust ports 258 and 256 back to the exhaust side of the hydraulic circuit.

As the rotor 206 is rotated in this manner, it imparts rotary motion to the power-transmitting member 222 (FIGURE 9) through the splined connection 216, 218, causing the power-transmitting member 222 to roll around in an orbital path and transmit motion at a reduced speed to the output shaft 234 at the splined connection 228, 230. The oppositely-beveled teeth 218 and 228 enable the dumbell-shaped power-transmitting member 222 to oscillate with a rocking motion as the rotor teeth 212 are pushed by the hydraulic pressure fluid into and out of the pockets 202 over the convex projections 204. The rotary motion imparted to the output shaft 234 also rotates the fluid timing and distributing head 232 integral therewith, thus successively covering and uncovering the ports 272 of the passageway 274 alternately to the downwardly-facing ducts 268 opening into the annular pressure channel 248 and the upwardly-facing ducts 270 opening into the annular exhaust channel 264. The needle bearing assembly 245 provides thrust bearing support for the upper end of the cup-shaped timing and distributing head and the rotary output shaft 234 of which it forms the upper part.

In particular, by reference to FIGURE 14 it will be seen that a four-lobed rotor 206 rolls around inside the five-recessed stator 190, each lobe 208 rolling from the crest of each projection 204 outward into the botom of each recess 202, then rolling inward to the crest of the next projection. Thus, when each lobe 208 rolls from one crest to the next crest, the rotor center 217 moves through an orbit in the opposite direction from the direction of rotation of the rotor 206 and output shaft 234. The result, therefore, is a speed reduction of five to one, and consequently a torque multiplication of one to five on the output shaft 234 without additional reduction gearing. During such rotation and rolling of the rotor 206, the lobes 208 successively and continuously open and close the spaces between the recesses 202 as they contact the projections 204 between the recesses 202. Meanwhile, the action of the fluid timer and distributor 232 causes half of these spaces to be supplied with pressure fluid and the other half to be exhausted.

What I claim is:

1. A compact portable work-gripping rotary machining appliance, comprising
    a supporting frame having a hollow base and an upright with an elongated guideway thereon,
    a work-gripping electromagnet within said base having a magnetic gripping face disposed approximately flush with the bottom of said base,
    means for selectively energizing said electromagnet into work-gripping condition,
    a carriage slidably mounted on said upright in guided engagement with said guideway,
    a hydraulic rotary motor on said carriage having a rotary output shaft with its axis parallel to said guideway,
    a rotary machining tool holder operatively connected to said output shaft in driven relationship therewith,
    feeding mechanism interposed between said carriage and said upright for moving said carriage relatively to said guideway in tool-holder-feeding motion relatively to said base,
    means for supplying hydraulic pressure to said motor, and
    spacing elements of non-magnetic material mounted in the bottom of said base and projecting outwardly therefrom in residual magnetism-breaking relationship to said gripping face of said electromagnet.

2. A compact portable work-gripping rotary machining appliance, according to claim 1, wherein said spacing elements are composed of hard non-metallic wear-resisting material.

3. A compact portable work-gripping rotary machining appliance, comprising
    a supporting frame having a hollow base and an upright with an elongated guideway thereon,
    a work-gripping electromagnet within said base having a magnetic gripping face disposed adjacent one side of said base,
    means for selectively energizing said electromagnet into work-gripping condition,
    a carriage slidably mounted on said upright in guided engagement with said guideway,
    a hydraulic rotary motor on said carriage having a rotary output shaft with its axis parallel to said guideway,
    a rotary machining tool holder operatively connected to said output shaft in driven relationship therewith,
    feeding mechanism interposed between said carriage and said upright for moving said carriage relatively to said guideway in tool-holder feeding motion relatively to said base,
    means for supplying hydraulic pressure to said motor,
    a machining center-locating device movably mounted on said base for motion selectively into and out of alignment with the axis of rotation of said tool holder,
    said center-locating device including a support pivotally mounted on said base for swinging motion relatively thereto between advanced and retracted positions and also including an alignment indicator mounted on said support and swingable therewith.

4. A compact portable work-gripping rotary machining appliance, according to claim 3, wherein said alignment indicator includes a pointed element having its pointed tip disposed in alignment with the axis of rotation of the tool holder.

5. A compact portable work-gripping rotary machining appliance, comprising,
    a supporting frame having a hollow base and an upright with an elongated guideway thereon,
    a work-gripping electromagnet within said base having a magnetic gripping face disposed adjacent one side of said base,
    means for selectively energizing said electromagnet into work-gripping condition,
    a carriage slidably mounted on said upright in guided engagement with said guideway,
    a hydraulic rotary motor on said carriage having a rotary output shaft with its axis parallel to said guideway,
    a rotary machining tool holder operatively connected to said output shaft in driven relationship therewith,
    feeding mechanism interposed between said carriage and said upright for moving said carriage relatively to said guideway in tool-holder-feeding motion relatively to said base,
    means for supplying hydraulic pressure to said motor,
    said rotary hydraulic motor including an open-centered stator with circumferentially-spaced multiple alternate internal recesses and convex projections,
    a rotor having multiple circumferentially-spaced lobes projecting outwardly therefrom into rolling engagement with said recesses and projections,
    a rotary hydraulic fluid distributor simultaneously supplying pressure fluid and withdrawing exhaust fluid from said circumferentially-spaced recesses, and
    a rotary orbitally-movable power transmitter operatively connecting said rotor to said fluid distributor, said fluid distributor being drivingly and directly connected to said output shaft for rotation unitarily therewith.

6. A compact portable work-gripping rotary machining appliance, according to claim 5, wherein said rotor and said fluid distributor have internally-toothed bores therein, and wherein said power transmitter at its opposite ends has axially-spaced convexly-toothed heads meshing with and rockably engaging said internally-toothed bores.

7. A compact speed-reducing hydraulic rotary motor, comprising,
    a casing,
    an open-centered stator connected to said casing and having circumferentially-spaced multiple alternate internal recesses and convex projections,
    a rotor having multiple circumferentially-spaced lobes projecting outwardly therefrom into rolling engagement with said recesses and projections,
    a rotary hydraulic fluid distributor simultaneously supplying pressure fluid and withdrawing exhaust fluid from said circumferentially-spaced recesses,
    a rotary orbitally-movable power transmitter operatively connecting said rotor to said fluid distributor, and
    a rotary power output shaft drivingly and directly connected to said fluid distributor for rotation unitarily therewith.

8. A compact speed-reducing hydraulic rotary motor, according to claim 7, wherein said rotor and said fluid distributor have internally-toothed bores therein, and wherein said power transmitter at its opposite ends has axially-spaced convexly-toothed heads meshing with and rockably engaging said internally-toothed bores.

9. A compact portable work-gripping rotary machining apparatus, comprising
    a drilling appliance having
        a supporting frame with a work-gripping electromagnet connected thereto,
        a carriage slidably mounted on said frame,
        a hydraulic rotary motor on said carriage having a rotary output shaft tool holder, and
        feeding mechanism interposed between said carriage and said frame for moving said carriage along said frame in tool holder feeding motion relatively to said frame;
    and a half-contained portable power unit having
        a hydraulic circuit including
            an electric motor,
            a hydraulic pump driven thereby,
            hydraulic fluid control valve means in circuit with said pump, flexible hydraulic fluid conduits connecting said control valve means to said rotary hydraulic motor,
a hydraulic fluid tank in circuit with said pump and valve means,
and an electric circuit including electric current supply means connected to said electric motor and electromagnet, and said electric circuit including remote control means disposed near said appliance and having switches therein controlling the energization of said electric motor and electromagnet.

10. A compact portable work-gripping rotary machining apparatus, comprising
a drilling appliance having
a supporting frame with a work-gripping electromagnet connected thereto,
a carriage slidably mounted on said frame,
a hydraulic rotary motor on said carriage having a rotary output shaft and tool holder,
and feeding mechanism interposed between said carriage and said frame for moving said carriage along said frame in tool holder feeding motion relatively to said frame;
and a self-contained portable power unit having
a hydraulic circuit including
an electric motor,
a hydraulic pump driven thereby,
a hydraulic fluid control valve means in circuit with said pump,
flexible hydraulic fluid conduits connecting said control valve means to said rotary hydraulic motor,
a hydraulic fluid tank in circuit with said pump and valve means,
and an electric circuit including electric current supply means connected to said electric motor and electromagnet,
said electric circuit also including remote control means with switches controlling the energization of said electric motor and electromagnet,
said hydraulic pump being a variable delivery pump having a movble flow control element and said remote control means including an electric flow control element shifter operatively connected to said flow control element and a pump flow control switch in said remote control means in controlling circuit with said flow control element shifter.

References Cited by the Examiner

UNITED STATES PATENTS

| | | | |
|---|---|---|---|
| Re. 25,126 | 2/1862 | Charlson | 91—56 X |
| Re. 25,291 | 12/1862 | Charlson | 91—56 |
| 2,030,280 | 2/1936 | Vigliano | 77—55 |
| 2,208,435 | 7/1940 | Simpson | 33—189 |
| 2,762,339 | 9/1956 | Schroeder | 77—6 X |
| 2,876,663 | 3/1959 | Buck. | |
| 3,169,415 | 2/1965 | Welty | 77—14 |

FOREIGN PATENTS 369,374   1/1907   France.

WILLIAM W. DYER, JR., *Primary Examiner.*
FRANCIS S. HUSAR, *Examiner.*